(12) United States Patent
Rozenfeld et al.

(10) Patent No.: US 9,928,331 B2
(45) Date of Patent: Mar. 27, 2018

(54) METHOD AND CONTROL DEVICE FOR CIRCUIT LAYOUT MIGRATION

(71) Applicants: Vladimir Pavlovich Rozenfeld, Andreevka (RU); Robert L. Maziasz, Austin, TX (US); Mikhail Anatolievich Sotnikov, Moscow (RU)

(72) Inventors: Vladimir Pavlovich Rozenfeld, Andreevka (RU); Robert L. Maziasz, Austin, TX (US); Mikhail Anatolievich Sotnikov, Moscow (RU)

(73) Assignee: NXP USA, Inc., Austin, TX (US)

( * ) Notice: Subject to any disclaimer, the term of this patent is extended or adjusted under 35 U.S.C. 154(b) by 501 days.

(21) Appl. No.: 14/561,280

(22) Filed: Dec. 5, 2014

(65) Prior Publication Data

US 2015/0356224 A1 Dec. 10, 2015

(30) Foreign Application Priority Data

Jun. 4, 2014 (RU) ................................ 2014122499

(51) Int. Cl.
*G06F 9/455* (2006.01)
*G06F 17/50* (2006.01)

(52) U.S. Cl.
CPC ...... *G06F 17/5072* (2013.01); *G06F 17/5063* (2013.01)

(58) Field of Classification Search
USPC .......................................................... 716/135
See application file for complete search history.

(56) References Cited

U.S. PATENT DOCUMENTS

| 7,086,020 B2 | 8/2006 | Chen et al. |
| 7,418,683 B1 | 8/2008 | Sonnard et al. |
| 7,665,054 B1 * | 2/2010 | Gopalakrishnan .. G06F 17/5072 716/122 |

(Continued)

OTHER PUBLICATIONS

Hao, Q. et al., "Constraints Generation for Analog Circuits Layout," 2004 International Conference on Communications, Circuits and Systems, 2004; vol. 2; pp. 1339-1343; Jun. 27-29, 2004.

(Continued)

*Primary Examiner* — Eric Lee (57) ABSTRACT

A method for circuit layout migration comprises creating a list of layout components in a source layout; determining a plurality of first groups of layout components being regularly aligned horizontally or vertically; determining first subsets of layout components which each belong to at least two of a respective set of determined first groups; determining a plurality of second groups of layout components, each second group comprising mutually exclusive ones of the first subsets of layout components; determining symmetry axes for pairs of second groups; building a constraint graph of the layout components of the source layout using alignment constraints for the alignment of layout components within each of the second groups and distance constraints for preserving a regularity pattern within each of the second groups and symmetry constraints for the determined symmetry axes for pairs of second groups; and performing constraint-graph-based compaction of the source layout.

19 Claims, 2 Drawing Sheets

(56) References Cited

U.S. PATENT DOCUMENTS

2012/0304139 A1* 11/2012 Chen .................. G06F 17/5072
716/111

OTHER PUBLICATIONS

Bourai, Y. et al., "Symmetry Detection for Automatic Analog-Layout Recycling," Proceedings of the ASP-DAC Design Automation Conference, 1999; Asia and South Pacific; pp. 5-8; vol. 1; Jan. 18-21, 1999.

Malavasi, E. et al., "Virtual Symmetry Axes for the Layout of Analog IC's," Proc. 2nd ICVC, pp. 195-198; Oct. 1991.

Dessouky, M., "Analog Design Migration: An Overview," 16th IEEE International Conference on Electronics, Circuits, and Systems, 2009. ICECS 2009. pp. 992,995, Dec. 13-16, 2009.

Okuda, R., et al., "An Efficient Algorithm for Layout Compaction Problem with Symmetry Constraints," 1989 IEEE International Conference on Computer-Aided Design, pp. 148-151; Nov. 5-9, 1989.

Felt, E. et al., "An Efficient Methodology for Symbolic Compaction of Analog IC's with Multiple Symmetry Constraints," 1992 IEEE Proceedings of the conference on European design automation, pp. 148-153; Sep. 7-10, 1992.

Jangkrajarng, N. et al., "Automatic Analog Layout Retargeting for New Processes and Device Sizes," Proceedings of the 2003 International Symposium on Circuits and Systems, 2003; pp. IV-704-IV-707; vol. 4; May 25-28, 2003.

Malavasi, E. et al., "Automation of IC Layout with Analog Constraints," IEEE Transactions on Computer-Aided Design of Integrated Circuits and Systems, vol. 15, No. 8, pp. 923-942; Aug. 1996.

Bhattacharya, S. et al., "Correct-by-Construction Layout-Centric Retargeting of Large Analog Designs," Proceedings of the 41st Annual Design Automation Conference. ACM, 2004; pp. 139-144.

Bhattacharya, S. et al., "Multilevel Symmetry-Constraint Generation for Retargeting Large Analog Layouts," IEEE Transactions on Computer-Aided Design of Integrated Circuits and Systems, vol. 25, No. 6, pp. 945-960; Jun. 2006.

Zhang, L. et al., "Parasitic-Aware Optimization and Retargeting of Analog Layouts: A Symbolic-Template Approach," IEEE Transactions on Computer-Aided Design of Integrated Circuits and Systems, vol. 27, No. 5; May 2008; pp. 791-802.

Bhattacharya, S. et al., "Hierarchical Extraction and Verification of Symmetry Constraints for Analog Layout Automation," Proceedings of the 2004 Asia and South Pacific Design Automation Conference; pp. 400-405; Jan. 2004.

Sagantec, "Sagantec Speeds Porting of High-Performance Interface IP at MoSys: About Anaconda-M," downloaded from <<http://www.sagantec.com/pr_07152009.html on Dec. 4, 2014, 2 pages.

* cited by examiner

METHOD AND CONTROL DEVICE FOR CIRCUIT LAYOUT MIGRATION

CROSS REFERENCE TO RELATED APPLICATION(S)

The present application claims priority to Russian Patent Application No. RU 2014122499, entitled "METHOD AND CONTROL DEVICE FOR CIRCUIT LAYOUT MIGRATION," filed on Jun. 4, 2014, the entirety of which is herein incorporated by reference.

FIELD OF THE INVENTION

This invention relates to a method, a computer readable program product and a control device for circuit layout migration, in particular in analog circuit layout migration on the basis of constraint graphs.

BACKGROUND OF THE INVENTION

Layouts for analog circuitry usually satisfy certain geometrical and topological layout constraints that enable the circuitry to function correctly and to comply with design specifications. Such geometrical and topological layout constraints include for example symmetries between components, absolute placement positions, relative placement positions, relative orientations of one type of components with regard to another type of components and similar constraints. During migration of analog layouts for analog integrated circuits from a manufacturing technology to layouts manufactured in another, e.g. more contemporary technology, such as from a 55 nm to a 40 nm CMOS manufacturing technology, the existing symmetries, alignments and regularities of the components' placement and wiring should be translated to the new design as precisely as possible.

Due to the high number count of components in modern circuitry analog layout constraints should be detectable automatically in order to reduce the amount of time and design expertise needed for migration. Existing solutions for automatic layout migration employ procedures that tend to over-constrain the compaction problem, which may result in long runtimes or even the failure to find a solution at all. For example, the methods for analog layout migration in documents U.S. Pat. Nos. 7,665,054 B1, 7,418,683 B1 and 7,086,020 B1 rely on the user's expertise and netlists of source objects.

SUMMARY OF THE INVENTION

The present invention provides a method, a computer readable program product and a control device for circuit layout migration as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale.

DETAILED DESCRIPTION OF THE PREFERRED EMBODIMENTS

Figure 1:
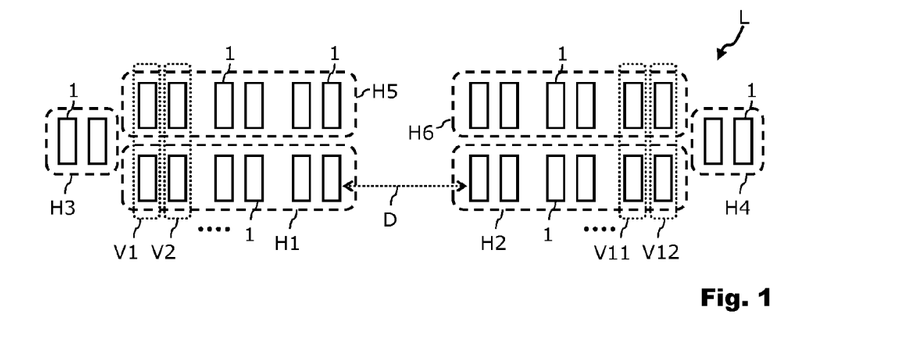
FIG. 1 schematically shows an exemplary circuit layout to be migrated and the respective detection of symmetry groups.
Figure 2:
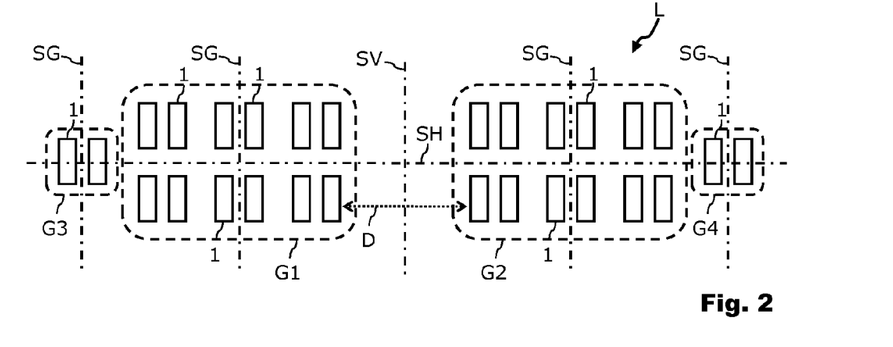
FIG. 2 schematically shows the exemplary circuit layout of FIG. 1 and the respective detection of alignment groups.
Figure 3:
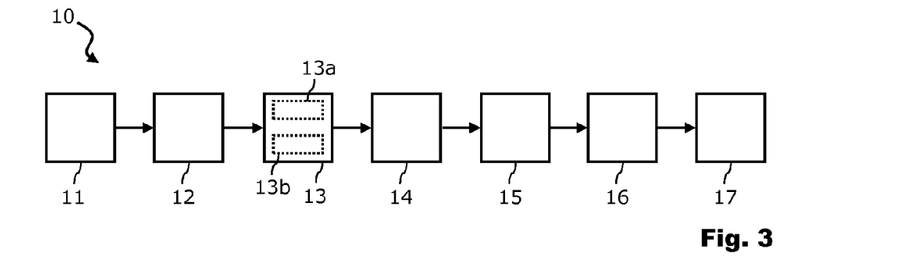
FIG. 3 shows a flowchart schematically illustrating an example of an embodiment of a method for analog circuit layout migration.

Referring first to FIG. 3, this schematically illustrates a method 10 for analog circuit layout migration, including but not limited to the exemplary analog circuit layouts as illustrated and explained in conjunction with FIGS. 1 and 2. The method 10 may be implemented by using a control device such as the control device 2 in FIG. 4. The method 10 may comprise, at 11, creating a list of layout components 1 in a source layout L. In this respect, it should be noted that the layout L is a set of data defining what structural features are to be present, as well as respective meta-information about the placement and orientation of the components 1 on an underlying fabrication substrate or die. However, for the sake of understanding, in the drawings the actual layout of the circuit, i.e. the physical circuit components 1 placed and oriented according to the layout L on an underlying fabrication integrated circuit substrate or die are shown. The layout components may for example comprise transistors, transistor channels, resistors, capacitors, transformers, conducting wires and similar distinctive functional semiconductor or metal components.

From the layout components 1 a plurality of first groups are determined, at 12. The first groups are formed by looking for layout components 1 that are regularly aligned horizontally or vertically, i.e. aggregations of layout components 1 that exhibit a certain type of regularity in their placement with respect to one dimension of the layout. The first groups may be split into two disjoint sets of groups, with a first of the disjoint sets consisting of first groups of layout components 1 that are regularly aligned horizontally, i.e. in x-direction, and a second of the sets consisting of first groups of layout components 1 that are regularly aligned vertically, i.e. in y-direction perpendicular to the x-direction. For determining one dimensional regular placement, a certain predetermined maximum range of regularity comparison may be introduced, so that the first groups are formed from components that are locally at close range.

At 13, first subsets of layout components 1 may then be determined wherein each layout component 1 of a certain subset belongs to at least two first groups of a respective set of determined first groups of layout components 1. Particularly, the determination may be made by creating a bipartite graph with the first groups as graph vertices. Graph edges are then formed between graph vertices that have a common membership of at least one layout component 1. Since the graph is bipartite, edges will only be formed between vertices of different disjoint sets of first groups. The bipartite graph may then be analysed with respect to the coherency of vertices by graph edges, and the layout components 1 of graph vertices that are interconnected by graph edges are associated with the respective first subsets of layout components 1.

At 14, a plurality of second groups of layout components 1, so called alignment groups are then formed. Each second group or alignment group comprises mutually exclusive ones of the first subsets of layout components 1. The alignment groups are two-dimensional layout groups the constituent layout components of which exhibit a certain local regularity between themselves. In that manner, fewer objects of higher layout hierarchy level may be obtained. Since each alignment group comprises multiple layout components linked by a certain regularity pattern, it may be possible to first consider alignment constraints among the limited number of layout components for each alignment group, then consider distance constraints that preserves regularity of layout components 1 in each alignment group, and, in a third step symmetry constraints between the alignment groups may be considered. That way, the number of symmetry constraints to be considered may be drastically reduced: The pairwise symmetry constraints between each pair of layout components are translated into a higher hierarchy level symmetry of the alignment groups, resulting in fewer symmetry constraints for the alignment groups only, while the alignment on the lower hierarchy level is preserved by considering local constraints within the alignment groups. The basic idea behind this procedure is to preserve regularity in the source layout in order to eliminate a multitude of redundant symmetry constraints.

At 15, the method 10 then employs determination of symmetry axes for pairs of second groups or alignment groups in the source layout L. If two or more pairs of second groups or alignment groups comprise the same symmetry axis, then the respective symmetry axes may be merged to remove redundant symmetry information and reduce the number of symmetry constraints to be considered.

At 16, a constraint graph may be built from the layout components 1 of the source layout L using alignment constraints for the alignment of layout components 1 within each of the second groups, distance constraints for the keeping regularity pattern inside each of the second groups, and symmetry constraints for the determined symmetry axes for pairs of second groups. This constraint graph may, at 17, be subject to constraint graph based compaction of the source layout L in order to arrive at a target layout.

If any inconsistency, i.e. over-constrainment, is found during the constraint-graph-based compaction, symmetrical constraint values that create a positive cycle may have their constraint length increased. A positive cycle of a constraint graph is a (closed) cycle over vertices in the constraint graph (the placement of the objects) whose sum of edge weights (the constraint values) is positive. Constraint graphs containing positive cycles are inconsistent by definition. Therefore, any positive cycles need to be converted into at least zero-length cycles. This may be done by increasing the absolute value of constraint length of at least one of the backward constraints forming an edge of a positive cycle in the constraint graph.

The constraint-graph-based compaction may be split up in several steps of lower compaction complexity: A first constraint-graph-based compaction may consider at first only the alignment constraints for the alignment of layout components 1 within each of the alignment groups. This ensures the alignment of objects within alignment groups. After the first constraint-graph-based compaction values for distance constraints between adjacent layout components are estimated, with the estimated distance constraints being included in the constraint graph. After the layout components 1 within the alignment groups have been compacted and the distance constraints have been estimated, the alignment groups themselves may be compacted. This may be done in a second constraint-graph-based compaction of the source layout L by using only the symmetry constraints for the determined symmetry axes for pairs of second groups, in order to preserve regularity (pitches) inside the alignment groups. After the second constraint-graph-based compaction and wire minimization of the source layout L, values for symmetry constraints can be defined based on output from the second constraint-graph-based compaction. Then, symmetry constraints are inserted into the constraint graph and third constraint-graph-based compaction is performed so that possible constraint conflicts may be resolved.

The stepwise constraint-graph-based compaction is the possibility to avoid linear programming (LP) algorithms altogether. This is mainly since the number of symmetry constraints to be considered is much lower than for conventional migration algorithms. The constraint-graph-based compaction as disclosed herein applies simple two-variable constraints and uses constraint length modification for resolving any remaining constraint conflicts. Therefore, the runtime for the migration procedure is lowered and the efficiency and probability to find a migration solution is greatly enhanced. Using regularity detection on the source layout L and deriving symmetry/matching constraints therefrom greatly reduces the number of constraints and avoids unnecessary constraints. Over-constraining is thus not an issue with the presently proposed layout migration method 10.

It will be apparent that after compaction, the final layout may be obtained, either directly by compaction or by performing further operations on the layout. Once the final layout is obtained, an analog integrated circuit may be manufactured according to the layout, e.g. by manufacturing a set of masks that allow to selectively deposit, remove, implant and process materials on or in the substrate to obtain the structures defined by the layout.

FIG. 1 schematically shows an exemplary integrated circuit layout L to be migrated from one technology level of semiconductor device fabrication to another, preferably higher technology level of semiconductor device fabrication. Circuit components 1 may include transistors, transistor channels, resistors, capacitors, transformers, conducting wires and similar distinctive functional semiconductor or metal components. The technology level of the layout L may have a typical half-pitch, i.e. the value of half the distance between identical components in the two-dimensional layout array. This half-pitch may for example be 22 nm in the current technology level of CMOS semiconductor device fabrication.

When transitioning existing circuit layout designs like the layout L to another, e.g. higher, technology level, for example from a 22 nm process technology node to a 14 nm process technology node, the existing layout needs to be changed and shrunken. Implementation of the design flow of layout migration might be done manually by redrawing the layout feature by feature, however, such a manual migration is very time-consuming and heavily reliant on human expertise. On the other hand, when implementing layout migration using automatic electronic design automation tools, care should be taken to minimize over-constraining and computation complexity.

To migrate the layout L to another technology level, the layout L is analysed for analog layout constraints first. This analysis relies on the detection of regularity and symmetry features between the constituting components 1 of the layout L. The detection may be based on finding or determining regular one-dimensional and two-dimensional alignment groups of components 1, depending on their alignment coordinates on the layout L. The alignment groups of components 1 may then be analysed for self-symmetry among each other to find symmetry axes of the layout L. Each pair of alignment groups may be checked for symmetry so that in a following migration phase the determined symmetry axes and regularity features may be kept as external constraints when performed graph-based compaction on the layout L.

FIG. 1 schematically illustrates a first detection phase for the layout L in which first one-dimensional groups or alignment are detected for the plurality of layout components 1. From a list of layout components 1 regular, array-like structures or geometric formations are determined by finding a first component of a component as possible starting element for a first group. Going horizontally or vertically on the source layout L from that possible starting element, further components 1 that have a distance in that direction which is not higher than a maximum adjacency threshold D are determined to be in a one-dimensional alignment group with the starting element.

A possible first horizontal group of alignment is shown as group H1, where six layout components 1 are adjacent to each other in x-direction, i.e. in a direction from left to right in the picture of FIG. 1. The group H2 is a possible second horizontal group of alignment, since its leftmost element is spaced apart by more than the maximum adjacency threshold D from the rightmost element of the group H1. Thus, the groups H1 and H2 are determined to be distinct first groups of horizontal alignment. Similarly, horizontal first groups H3, H4, H5 and H6 are formed which exhibit some form of regularity of their constituting layout components 1 in x-direction.

A possible first vertical group of alignment is shown as group V1, where two layout components 1 are adjacent to each other in y-direction, i.e. in a direction from top to bottom in the picture of FIG. 1. Similar vertical first groups of alignment V2, . . . , V11, V12 are formed from two regularly placed layout components 1 in each case. The layout components 1 of the horizontal first groups H3 and H4 are not placed into vertical first groups of alignment since for a possible starting element there are no further regularly placed layout components 1 present in y-direction, i.e. in a direction from top to bottom in FIG. 1.

As can be seen from FIG. 1, the vertical first groups V1, V2, . . . , V11, V12 and the horizontal first groups H1, H2, H5 and H6 form independent sets of first groups that may be used to create a bipartite graph with the vertical groups and the horizontal groups forming respectively disjoint sets of vertices of the graph. The vertices, i.e. individual first groups in the respective disjoint set of vertices, may then be interconnected via graph edges in the bipartite graph, if a particular layout component 1 is member of both these individual first groups. That way, clusters of interconnected vertices in the bipartite graph may be identified, that—by nature of construction—form disjoint sets of interconnected vertices. These disjoint sets may then be used to determine two-dimensional alignment groups as second groups which comprise layout components 1 that are affiliated with each other by way of regular alignment in two dimensions in the source layout L.

Such a determination of alignment groups is schematically illustrated in FIG. 2. The horizontal first groups H1 and H5 are grouped up with the vertical first groups V1 to V6 in an alignment group G1. Similarly, the horizontal first groups H2 and H6 are grouped up with the vertical first groups V7 to V12 in an alignment group G2. The horizontal groups H3 and H4 form alignment groups G3 and G4 of their own since they do not share any layout components 1 as common members with vertical groups.

For the arrangement of the alignment groups G1 to G4, symmetry axes in the layout L may be determined. In the exemplary case of FIG. 2, horizontal symmetry axes are found for each of the alignment groups G1 to G4. Since the horizontal symmetry axes of each alignment group G1 to G4 are identical, they may be merged to an encompassing horizontal symmetry axis SH. In the same manner, vertical symmetry axes SV may be found for each pair of the alignment groups G1 and G2 as well as G3 and G4. Since the vertical symmetry axes of each of the pairs of alignment group G1 and G2 as well as G3 and G4 are identical, they may be merged to an encompassing vertical symmetry axis SV in the middle between the alignment groups G1 and G2. Moreover, self-symmetry axes SG of each of the alignment groups G1 and G2 as well as G3 and G4 may be found.

The grouping of layout components 1 in alignment groups G1 to G4 and the found, and possibly merged, inter-group symmetry axes SH and SV and optionally intra-group symmetry axes SG may serve for the construction of a constraint graph for the source layout L. First of all, a first stage constraint-graph-based compaction and wire minimization may be performed on the members of the alignment groups G1 to G4 individually with alignment constraints only to preserve regularity within the alignment groups. This ensures maintenance of any alignment of objects within the alignment groups.

After the first stage of constraint-graph-based compaction distance intervals between consecutive rows and/or columns of the alignment groups G1 to G4 may be estimated, i.e. the spread between maximum and minimum distances present between adjacent columns may be determined. Distance constraints may then be selected for each pair of consecutive columns/rows of the alignment groups G1 to G4, so that the constraint-graph-based compaction algorithm and possibly wire minimization will keep distances between adjacent layout components locally. Since the alignment groups G1 to G4 are, by virtue of construction, spaced apart by at least the maximum adjacency threshold D, distance constraints between members of different alignment groups G1 to G4 will not need to be taken into account any further. The second stage of constraint-graph-based compaction, with wire minimization, takes into account the selected distance constraints in the constraint graph to preserve equality between input pitches within the alignment groups.

After the second stage of constraint-graph-based compaction values of symmetry constraints may be derived from the coordinates of layout components 1 and the respectively determined symmetry axes SH, SV. The symmetry constraints are taken into account in the third stage of constraint-graph-based compaction and wire minimization that preserves symmetry among the alignment groups G1 to G4. In this third stage, the alignment groups G1 to G4 are contemplated as singular objects, irrespective of the relative placement of their constituting layout components 1. Thus, the higher hierarchy level to be considered allows the method to disregard symmetry constraints between pairs of individual layout components 1 but only considers symmetry constraints between pairs of alignment groups. In that manner, for the example of FIGS. 1 and 2, the number of symmetry constraints to be considered may be reduced to six, i.e. three for each pair of symmetrical alignment groups (G1 and G2;

G3 and G4). If each pair of layout component 1 of FIGS. 1 and 2 would be considered separately, 42 symmetry constraints would have to be taken into account, i.e. three constraints for each of the 14 pairs of symmetrical layout components.

Therefore, the third stage of constraint-graph-based compaction may be performed without the need for any linear programming technique, since the number of constraints to be taken into account is considerably reduced. Moreover, the source layout L will not be over-constrained with regard to symmetry, since symmetry between individual pairs of layout components 1 is split up in regularity in the local surrounding of the layout components 1 on one hand and group symmetry of layout components 1 with the same local regularity with regard to distant layout components 1 on the other hand.

Figure 4:
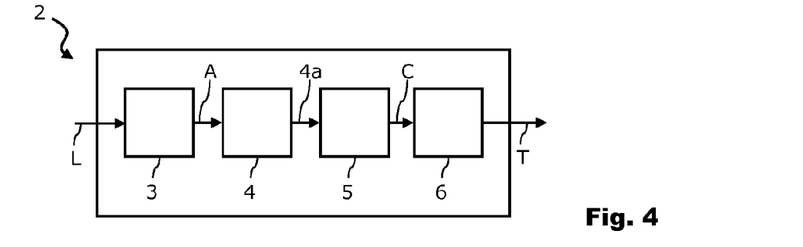
FIG. 4 shows a block-diagram schematically illustrating a control device for circuit layout migration according to an embodiment of the invention.

FIG. 4 schematically illustrates a functional block diagram of a control device 2 for circuit layout migration. The control device 2 comprises a list generator engine 3 which receives a source layout L as input and is configured to create a list of layout components 1 in the source layout L. The list generator engine 3 outputs the list as output 3a to a component group generator engine 4 which is configured to determine a plurality of first groups V1, . . . , V12; H1, . . . , H6 of layout components 1 being regularly aligned horizontally or vertically. The first groups V1, . . . , V12; H1, . . . , H6 are then analysed with respect to common memberships of layout components 1 to each group. Based on the analysis the component group generator engine 4 is configured to determine first subsets of layout components 1 which each belong to at least two of a respective set of determined first groups V1, . . . , V12; H1, . . . , H6 of layout components 1, i.e. a first subset of layout components 1 consists of layout components 1 that each belong to at least two first groups which in turn form a set of first groups that do not have any other layout components 1 in common with other first groups outside the set. The determination of the first subsets of layout components 1 may in particular be done in the component group generator engine 4 by creating a bipartite graph with the first groups of layout components 1 as graph vertices and common membership of at least one layout component 1 between two first groups as graph edges. The bipartite graph is then analysed for disjoint sets of vertices that are connected by graph edges among themselves, but not to other vertices outside the sets. By associating the layout components 1 of graph vertices of the determined sets the respective first subsets of layout components 1 may be formed.

The component group generator engine 4 is then configured to determine a plurality of second groups G1, . . . , G4 of layout components 1, each second group G1, . . . , G4 comprising mutually exclusive ones of the first subsets of layout components 1. The second groups or alignment groups are hierarchically higher level layout objects that include each a plurality of layout components 1 affiliated with each other due to some regularity. The component group generator engine 4 may furthermore determine symmetry axes for pairs of the second groups or alignment groups. If two or more pairs of second groups G1, . . . , G4 comprise the same symmetry axis SH, SV, the component group generator engine 4 may be able to merge the respective symmetry axes SH; SV, in order to reduce the number of redundant symmetry constraints.

The component group generator engine 4 outputs the determined second groups or alignment groups as well as determined constraints among the layout components 1 and symmetries to a graph generator engine 5 as output 4a. The graph generator engine 5 is configured to build a constraint graph C of the layout components 1 of the source layout L using alignment constraints for the alignment of layout components 1 within each of the second groups G1, . . . , G4 and symmetry constraints for the determined symmetry axes SH; SV for pairs of second groups G1, . . . , G4. Moreover, the graph generator engine 5 may additionally take into account distance constraints between adjacent layout components 1, i.e. maximum and/or minimum distances between adjacent layout components 1 or component types, in building the constraint graph C of the layout components 1.

A layout compaction engine 6 receives the built constraint graph C and is configured to perform constraint graph based compaction of the source layout L in order to produce a target layout T that is migrated to another technology level of the circuit manufacturing technique. The layout compaction engine 6 may in particular be configured to perform a first constraint-graph-based compaction of the source layout L using the alignment constraints for the alignment of layout components 1 within each of the second groups G1, . . . , G4, a second constraint-graph-based compaction of the source layout L using distance constraints within each of the second groups G1, . . . , G4, and a third constraint-graph-based compaction of the source layout L using the symmetry constraints for the determined symmetry axes SH; SV for pairs of second groups G1, . . . , G4.

Figure 5:
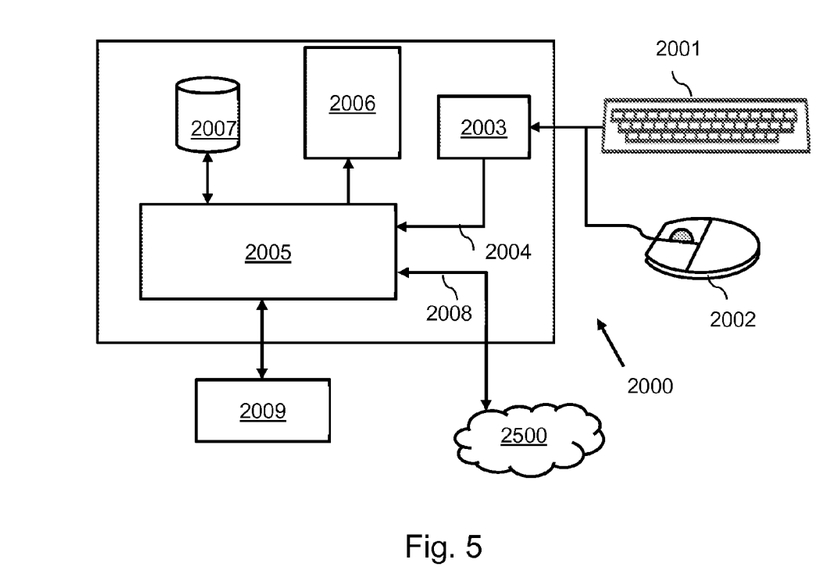
FIG. 5 schematically shows an exemplary user interaction system.

FIG. 5 schematically shows an exemplary user interaction system 2000 having a programmable processor 2005. The user interaction system 2000 is shown to be a personal computer, but may be any type of suitable user interaction system 2000. The programmable processor 2005 may comprise one or more components of system 100. The user interaction system 2000 further comprises a storage unit 2007, a user input 2003 and a display 2006. The user input 2003 allows the user to input user data and user instructions 2004 to the processor 2005 by e.g. using a keyboard 2001 or a mouse 2002. Also, although not shown, the display 2006 may comprise a touch-sensitive surface for enabling the user to provide user data and user instructions to the user input 2003 by means of touching the display 2006. The processor 2005 is arranged to perform any one of the methods according to the above discussed examples, to receive user data and user instructions 2004, to present visual information on the display 2006 and to communicate with a data I/O device 2009, such as an optical disc drive or a solid state reader/writer. The processor 2005 is arranged to cooperate with the storage unit 2007, allowing storing and retrieving information on the storage unit 2007, such as the source layout, the constraint graph or a target layout generated using the constraint graph, i.e. by compacting the constraint graph. The user interaction system 2000 may further comprise a communication channel 2008 allowing the processor 2005 to communicate with other devices. The user interaction system 2000 may allow the user to start any one of the methods according to the above discussed examples and/or inspecting on the display 2006, e.g. the layout, any intermediate obtained during the circuit layout migration. The processor 2005 may be capable to read, using the data I/O device 2009, a computer readable medium comprising a program code. The processor 2005 may be capable to read, using the data I/O device 2007, a computer readable medium comprising a computer program product comprising instructions for causing the user interaction system 2000 to perform a method of circuit layout migration.

The invention may also be implemented in a computer program for running on a computer system, at least including code portions for performing steps of a method according to the invention when run on a programmable apparatus, such as a computer system or enabling a programmable apparatus to perform functions of a device or system according to the invention. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system. FIG. 6 shows a computer readable medium 3000 comprising a computer program product 3100, the computer program product 3100 comprising instructions for causing a processor to perform a circuit layout migration as explained above, or which configure a programmable processor as the control device 2. The computer program product 3100 may be embodied on the computer readable medium 3000 as physical marks or by means of magnetization of the computer readable medium 3000. However, any other suitable embodiment is conceivable as well. Furthermore, it will be appreciated that, although the computer readable medium 3000 is shown in FIG. 6 as an optical disc, the computer readable medium 3000 may be any suitable computer readable medium, such as any tangible, non-transitory data carrier, such as a hard disk, solid state memory, flash memory, etc., and may be non-recordable or recordable. The computer readable medium may further be a data connection, such as a telephone cable or a wireless connection.

In the foregoing specification, the invention has been described with reference to specific examples of embodiments of the invention. It will, however, be evident that various modifications and changes may be made therein without departing from the broader scope of the invention as set forth in the appended claims and that the claims are not limited to the examples. For example, the connections may be a type of connection suitable to transfer signals from or to the respective nodes, units or devices, for example via intermediate devices. Accordingly, unless implied or stated otherwise the connections may for example be direct connections or indirect connections.

Because the apparatus implementing the present invention is, for the most part, composed of electronic components and circuits known to those skilled in the art, details of the circuitry and its components will not be explained in any greater extent than that considered necessary as illustrated above, for the understanding and appreciation of the underlying concepts of the present invention and in order not to obfuscate or distract from the teachings of the present invention.

Although the invention has been described with respect to specific conductivity types or polarity of potentials, skilled artisans appreciated that conductivity types and polarities of potentials may be reversed.

Some of the above embodiments, as applicable, may be implemented using a variety of different circuitry components. For example, the exemplary topology in the figures and the discussion thereof is presented merely to provide a useful reference in discussing various aspects of the invention. Of course, the description of the topology has been simplified for purposes of discussion, and it is just one of many different types of appropriate topologies that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

In the claims, any reference signs placed between parentheses shall not be construed as limiting the claim. The word "comprising" does not exclude the presence of other elements or steps then those listed in a claim. Furthermore, the terms "a" or "an", as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage. The order of method steps as presented in a claim does not prejudice the order in which the steps may actually be carried, unless specifically recited in the claim.

The invention claimed is:

1. A method for manufacturing a set of masks based on circuit layout migration:
   wherein the circuit layout migration includes,
      creating a list of layout components in a source layout, wherein the list of layout components in a source layout includes conducting wires;
      determining a plurality of first groups of layout components being regularly aligned horizontally or vertically;
   determining first subsets of layout components which each belong to at least two of a respective set of determined first groups of layout components;
      determining a plurality of second groups of layout components, each second group comprising mutually exclusive ones of the first subsets of layout components;
      determining symmetry axes for pairs of second groups in the source layout;
      building a constraint graph of the layout components of the source layout using alignment constraints for the alignment of layout components within each of the second groups, distance constraints for keeping regularity patterns within each of the second groups, and symmetry constraints for the determined symmetry axes for pairs of second groups; and
      performing constraint graph based compaction of the source layout using the built constraint graph; and wherein the manufacturing includes,
  manufacturing the set of masks based on the constraint graph based compaction of the source layout.

2. The method of claim 1, wherein determining the first subsets of layout components comprises:
  creating a bipartite graph with the first groups of layout components as graph vertices and common membership of at least one layout component between two first groups as graph edges; and
  associating the layout components of graph vertices being interconnected by graph edges with the respective first subsets of layout components.

3. The method of claim 2, wherein the bipartite graph comprises two disjoint sets of vertices, a first of the disjoint sets consisting of first groups of layout components being regularly aligned horizontally and a second of the disjoint sets consisting of first groups of layout components being regularly aligned vertically.

4. The method of claim 3, wherein, if two or more pairs of second groups comprise the same symmetry axis, the respective symmetry axes are merged.

5. The method of claim 2, wherein, if two or more pairs of second groups comprise the same symmetry axis, the respective symmetry axes are merged.

6. The method of claim 1, wherein, if two or more pairs of second groups comprise the same symmetry axis, the respective symmetry axes are merged.

7. The method of claim 6, wherein a first constraint-graph-based compaction of the source layout is performed using the alignment constraints for the alignment of layout components within each of the second groups, and
  wherein a second constraint-graph-based compaction of the source layout is using the distance constraints for preserving regularity pattern within each of the second groups, and wherein a third constraint-graph-based compaction is using the symmetry constraints for the determined symmetry axes for pairs of second groups.

8. The method of claim 7, wherein building the constraint graph of the layout components of the source layout uses distance constraints between adjacent layout components, and wherein the constraint graph of the layout components of the source layout is fixed for possible constraint conflicts by taking into account symmetry constraints.

9. The method of claim 1, wherein a first constraint-graph-based compaction of the source layout is performed using the alignment constraints for the alignment of layout components within each of the second groups, and
  wherein a second constraint-graph-based compaction of the source layout is using the distance constraints for preserving regularity pattern within each of the second groups, and wherein a third constraint-graph-based compaction is using the symmetry constraints for the determined symmetry axes for pairs of second groups.

10. The method of claim 1, wherein building the constraint graph of the layout components of the source layout uses distance constraints between adjacent layout components, and wherein the constraint graph of the layout components of the source layout is fixed for possible constraint conflicts by taking into account symmetry constraints.

11. A control device for manufacturing a set of masks based on circuit layout migration:
  wherein the circuit layout migration includes,
    a list generator engine configured to create a list of layout components in a source layout, wherein the list of layout components in a source layout includes conducting wires;
    a component group generator engine configured to determine a plurality of first groups of layout components being regularly aligned horizontally or vertically, to determine first subsets of layout components which each belong to at least two of a respective set of determined first groups of layout components, and to determine a plurality of second groups of layout components, each second group comprising mutually exclusive ones of the first subsets of layout components;
    a graph generator engine configured to build a constraint graph of the layout components of the source layout using alignment constraints for the alignment of layout components within each of the second groups, distance constraints between adjacent layout components within each of the second groups and symmetry constraints for determined symmetry axes for pairs of second groups; and
    a layout compaction engine configured to perform constraint-graph-based compaction of the source layout using the built constraint graph; and
  wherein the manufacturing includes,
    manufacturing the set of masks based on the constraint-graph-based compaction of the source layout.

12. The control device of claim 11, wherein the component group generator engine is further configured to create a bipartite graph with the first groups of layout components as graph vertices and common membership of at least one layout component between two first groups as graph edges, and to associate the layout components of graph vertices being interconnected by graph edges with the respective first subsets of layout components.

13. The control device of claim 12, wherein, if two or more pairs of second groups comprise the same symmetry axis, the component group generator engine is configured to merge the respective symmetry axes.

14. The control device of claim 11, wherein, if two or more pairs of second groups comprise the same symmetry axis, the component group generator engine is configured to merge the respective symmetry axes.

15. The control device of claim 14, wherein the layout compaction engine is configured to perform a first constraint-graph-based compaction of the source layout using the alignment constraints for the alignment of layout components within each of the second groups, and a second constraint-graph-based compaction of the source layout using distance constraints between adjacent layout components within each of the second groups, and a third constraint-graph-based compaction of the source layout using only the symmetry constraints for the determined symmetry axes for pairs of second groups.

16. The control device of claim 15, wherein the graph generator engine is further configured to use distance constraints between adjacent layout components in building the constraint graph of the layout components.

17. The control device of claim 11, wherein the layout compaction engine is configured to perform a first constraint-graph-based compaction of the source layout using the alignment constraints for the alignment of layout components within each of the second groups, and a second constraint-graph-based compaction of the source layout using distance constraints between adjacent layout components within each of the second groups, and a third constraint-graph-based compaction of the source layout using only the symmetry constraints for the determined symmetry axes for pairs of second groups.

18. The control device of claim 11, wherein the graph generator engine is further configured to use distance constraints between adjacent layout components in building the constraint graph of the layout components.

19. An integrated circuit including structures based on circuit layout migration:

wherein the circuit layout migration includes, creating a list of layout components in a source layout, wherein the list of layout components in a source layout includes conducting wires;

determining a plurality of first groups of layout components being regularly aligned horizontally or vertically;

determining first subsets of layout components which each belong to at least two of a respective set of determined first groups of layout components;

determining a plurality of second groups of layout components, each second group comprising mutually exclusive ones of the first subsets of layout components;

determining symmetry axes for pairs of second groups in the source layout;

building a constraint graph of the layout components of the source layout using alignment constraints for the alignment of layout components within each of the second groups, distance constraints for keeping regularity patterns within each of the second groups, and symmetry constraints for the determined symmetry axes for pairs of second groups; and performing constraint graph based compaction of the source layout using the built constraint graph; and wherein the integrated circuit structures are based on the constraint graph based compaction of the source layout.

* * * * *